US012643808B2

(12) United States Patent
Eidem et al.

(10) Patent No.: US 12,643,808 B2
(45) Date of Patent: Jun. 2, 2026

(54) PROCESS FOR TREATING A WASTE MATERIAL CONTAMINATED WITH PERFLUORO-AND POLYFLUOROALKYL SUBSTANCES (PFAS)

(71) Applicant: NULIFE GreenTech Inc., Saskatoon (CA)

(72) Inventors: Brock Eidem, Corman Park (CA); Jerry Kristian, Saskatoon (CA); Kieran Lewko, Saskatoon (CA); Shi Qiu, Saskatoon (CA)

(73) Assignee: NULIFE GreenTech Inc., Saskatoon (CA)

( * ) Notice: Subject to any disclaimer, the term of this patent is extended or adjusted under 35 U.S.C. 154(b) by 387 days.

(21) Appl. No.: 18/521,900

(22) Filed: Nov. 28, 2023

(65) Prior Publication Data

US 2024/0174541 A1      May 30, 2024

Related U.S. Application Data

(60) Provisional application No. 63/428,301, filed on Nov. 28, 2022.

(51) Int. Cl.
*C02F 11/18* (2006.01)
*C10L 1/04* (2006.01)
*C02F 101/36* (2006.01)

(52) U.S. Cl.
CPC ................. *C02F 11/18* (2013.01); *C10L 1/04* (2013.01); *C02F 2101/36* (2013.01); *C10L 2290/26* (2013.01)

(58) Field of Classification Search
CPC ........ C02F 11/18; C02F 2101/36; C10L 1/04; C10L 2290/26
See application file for complete search history.

(56) References Cited

U.S. PATENT DOCUMENTS

| | | | |
|---|---|---|---|
| 11,577,111 B2 | 2/2023 | Strathmann et al. | |
| 2019/0249087 A1 | 8/2019 | Kristian et al. | |
| 2022/0062843 A1 | 3/2022 | Liang et al. | |

FOREIGN PATENT DOCUMENTS

| | | | | |
|---|---|---|---|---|
| CA | 3011641 | 3/2018 | | |
| CA | 3011641 A1 * | 3/2018 | ........... | B01D 17/042 |

OTHER PUBLICATIONS

Yu, et al., "Fate of per- and polyfluoroalkyl substances (PFAS) during hydrothermal liquefaction of municipal wastewater treatment sludge," Environ. Sci.: Water Res. Technol., 2020, 6, 1388 (Year: 2020).*

Jie Yu, et al, Fate of per- and polyfluoroaklyl substances (PFAS) during hydrothermal liquefaction of municipal wastewater treatment sludge, Environ. Sci.: Water Res. Technol., 2020, 6, 1388-1399, https://doi.org/10.1039/C9EW01139K.

Weilan Zhang, et al., Destruction of Perfluoroalkyl Acids Accumulated in Typha latifolia through Hydrothermal Liquefaction, ACS Sustainable Chem. Eng. 2020, 8, 25, 9257-9262, https://doi.org/10.1021/acssuschemeng.0c03249.

* cited by examiner

*Primary Examiner* — Patrick Orme
(74) *Attorney, Agent, or Firm* — MBM Intellectual Property Law LLP

(57)      ABSTRACT
The present invention provides an improved hydrothermal liquefaction process for managing and sequestering PFAS contaminants in waste materials.

15 Claims, No Drawings

PROCESS FOR TREATING A WASTE MATERIAL CONTAMINATED WITH PERFLUORO-AND POLYFLUOROALKYL SUBSTANCES (PFAS)

FIELD OF INVENTION

The present invention pertains to the field of management of perfluoro- and polyfluoro-alkyl substances (PFAS) in waste materials. In particular, hydrothermal treatment of waste materials containing perfluoro- and polyfluoro-alkyl substances.

BACKGROUND OF THE INVENTION

Per- and polyfluoro-alkyl substances (PFAS) are a class of synthetically made organofluorine compounds that are used to make fluoropolymer coatings and products that resist heat, oil, stains, grease, and water. Fluoropolymer coatings can be in a variety of products. PFAS are also known as "forever chemicals" as these compounds do not breakdown in the environment and are also extremely resistant to chemical degradation.

Because of their widespread use and their persistence in the environment, many PFAS are found in water, soil, food crops, blood of humans and animals all over the world, and are present at low levels in a variety of food products and in the environment.

PFAS exposure can lead to adverse health effects in humans and animals. PFAS have been linked to cancer, thyroid disruption, liver problems, birth defects, immuno-suppression and more. Increasingly, many regulatory agencies like U.S. Environmental Protection Agency (EPA) has declared PFAS hazardous chemicals, and are proposing limits and recommending PFAS testing in water.

Typically, PFAS concentrations for maximum contaminants levels or healthy advisory limits (HAL) for acceptable environmental regulation thresholds are required to meet the parts per trillion concentrations (i.e., ppt or ng/L). The EPA has proposed the first standards to make drinking water safer from 'forever chemicals', which would regulate two chemicals, PFOA and PFOS at 4 parts per trillion (ppt).

Several technologies have been investigated for mitigation of PFAS from contaminated environments. The most extensively used technology for PFAS removal during wastewater treatment is sorption technology, which sorption media, such as activated carbon, ion-exchange resin, and organoclay to sequester PFAS via hydrophobic and/or electrostatic interactions. The sorption of short-chain PFAS with activated carbon is less effective because they generally show less hydrophobicity. Ion-exchange resin and organoclay can sorb PAFS via electrostatic charges, and therefore, show higher sorption efficiency for short-chain PFAS, when compared with activated carbon. However, the high total organic carbon (TOC) and high total dissolved solids (TDS) in landfill leachate can reduce the sorption capacity of PFAS, especially for short-chain PFAS. High TOC competes for hydrophobic sorption and high salinity competes for electrostatic charge sorption. Moreover sorption technology requires replacement and/or disposal of the spent media after regeneration or reactivation, and is energy consuming.

Other technologies involving reverse osmosis (RO), coagulation & flocculation, foam fractionation, and oxidation have also been investigated. These technologies are generally less effective for short-chain PFAS, and none of the technologies can readily achieve the recently recommended levels from the national regulatory progress.

Recently, hydrothermal liquefaction (HTL) technology has been explored for degradation and mineralization of the PFAS contaminants (U.S. Pat. No. 11,577,111 and US Publication No. 2022/0062843). The degradation and mineralization of PFAS require specific treatments of the waste material before subjecting same to HTL and/or require use of specific solvents and catalysts, which make these processes expensive and complicated.

Therefore there is a need for simpler and less expensive technologies to manage PFAS in waste materials.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a process for treating waste materials contaminated with per- and polyfluoroalkyl substances (PFAS) to manage PFAS contamination.

In accordance with an aspect of the present invention, there is provided a process for treating a waste material contaminated with per- and polyfluoroalkyl substances (PFAS), which comprises: providing a feedstock comprising the waste material, the feedstock having a moisture content; processing the waste material under hydrothermal liquefaction (HTL) reaction conditions comprising a temperature in the range of about 300-450° C., and a pressure in the range of about 3000 psi to about 3750 psi (about 20 MPa to about 26 MPa), for a reaction time up to 15 minutes, to obtain a processed mixture comprising biocrude oil, biochar, water and PFAS components, wherein the waste material is processed in the absence of additional solvent and a catalyst; and separating the processed mixture into a liquid fraction comprising the biocrude oil and a portion of the PFAS components, a solid fraction comprising the biochar and a portion of the PFAS components, and an aqueous fraction substantially devoid of PFAS components.

DETAILED DESCRIPTION OF THE INVENTION

Unless defined otherwise, all technical and scientific terms used herein have the same meaning as commonly understood by one of ordinary skill in the art to which this invention belongs.

Unless the context requires otherwise, throughout this specification and claims, the words "comprise", "comprising" and the like are to be construed in an open, inclusive sense.

The articles "a" and "an" are used herein to refer to one or to more than one (i.e., to at least one) of the grammatical object of the article. By way of example, "an element" means one element or more than one element.

As used herein, the term "about" refers to approximately a +/−10% variation from a given value. It is to be understood that such a variation is always included in any given value provided herein, whether or not it is specifically referred to.

The present disclosure provides a simpler and more cost effective hydrothermal liquefaction process for managing PFAS contamination in waste materials. The process of the present disclosure allows for concentrating/partitioning of the PFAS contaminants in the biocrude oil and the biochar fractions of the obtained products, and the PFAS contaminants can be easily and permanently sequestered along with the biochar and/or biocrude oil.

Under the processing conditions of the process of the present disclosure, PFAS components undergo a transition from the aqueous phase to the HTL/biocrude oil and the biochar phases. During this migration, a minor portion of PFAS (approximately 3-5%) undergoes chemical destruction, while the majority (about 90-95%) is effectively concentrated in the resulting biocrude oil and biochar phases. This selective concentration mechanism serves as an effective means of separating PFAS from contaminated water.

The strategic concentrating/partitioning of the PFAS not only minimizes PFAS release into the environment but also provides a practical method for managing and sequestering these persistent substances within the biocrude oil and biochar products.

In one aspect, the present disclosure provides a process for treating a waste material contaminated with per- and polyfluoro-alkyl substances (PFAS). The process comprises processing the waste material under hydrothermal liquefaction (HTL) reaction conditions comprising a temperature in the range of about 300-450° C., a pressure in the range of about 3000 to about 3800 psi (about 20 MPa to about 26 MPa) for a selected reaction time period, to obtain a processed mixture comprising biocrude oil, biochar, water and PFAS components. The processed mixture is separated into a liquid fraction comprising the biocrude oil and a portion of the PFAS components, a solid fraction comprising the biochar and a portion of the PFAS components, and an aqueous fraction. The process of the present disclosure can be conducted without requiring the presence of additional solvents and/or catalyst.

The process of the present invention partitions/concentrates the PFAS components into the liquid biocrude and solid biochar fractions, while leaving the aqueous fraction substantially devoid of PFAS components.

As used herein, the term "PFAS components" refers to partially degraded short chain PFAS compounds formed during the HTL processing.

In some embodiments, the process of the present disclosure is a continuous flow process.

In some embodiments, the selected reaction time is up to 30 min. In some embodiments, the selected reaction time is less than 20 min. In some embodiments, the selected resident time is less than 15 min. In some embodiments, the reaction time is less than 10 min.

In some embodiments, the temperature may be about 350° C., 355° C., 360° C., 365° C., 370° C., 375° C., 380° C., 385° C., 390° C., 395° C., 400° C., or a temperature between any two of these values. In some embodiments, the reaction temperature is about 350° C. to about 380° C.

In some embodiments, the pressure may be about 3100 psi, 3150 psi, about 3200 psi, 3250 psi, 3300 psi, 3350 psi, about 3400, about 3450 psi, about 3500 psi, about 3600 psi, about 3650 psi, about 3700, about 3750 psi, or a pressure between any two of these values. In some embodiments, the HTL pressure is about 3100-3300 psi.

In some embodiments, the process includes rapidly elevating the temperature of the waste material from ambient levels to the range of about 300° C. to about 450° C. For example, increasing the temperature at a rate from 15° C./min to 60° C./min, ensuring an efficient and controlled transition.

Following the completion of the HTL reaction, the processed mixture may undergo a quenching process for deactivating and stabilizing PFAS components thereby, mitigating the risk of any undesirable side reactions. In some embodiments, the process of the present disclosure includes quenching the processed mixture at a regulated rate, for example, ranging from 30° C./min to 50° C./min, to maintain the integrity and desired properties of the produced materials while averting unintended chemical transformations.

The liquid fraction and the solid biochar fraction carrying the PFAS components can be stored or subjected to a carbon sequestration process, thereby sequestering the PFAS.

Alternatively, the liquid fraction carrying the PFAS contaminants can be subjected to upgrading/refining processes to obtain fuel and to separate the PFAS components. Similarly, the solid biochar fraction carrying the PFAS contaminants can be subjected to upgrading/refining processes to separate the PFAS components.

The aqueous fraction can be further treated to obtain treated water suitable for recycling into the process or environment, and/or for obtaining drinking water.

The process of the present disclosure can be used to treat different types of waste materials including municipal solid or liquid waste, waste water sludge, sewage sludge, contaminated recycling waste, diverted organics, biosolids, chemical production waste streams, agricultural wastes or residues, forestry wastes or residues, waste materials from food manufacturing processes, etc.

In some embodiments, the waste material is sewage sludge or waste water sludge.

In some embodiments, the waste material is a mixture of sewage sludge and agricultural residues or forestry residues. In some embodiments, the waste material is a mixture of waste water sludge and agricultural residues or forestry residues.

In some embodiments, the process involves mixing water with the waste material to obtain a waste material feedstock of a desired viscosity and/or consistency. In some embodiments, the waste material feedstock is in the form of a slurry.

Where solid waste material is used, it may be required to grind or otherwise process the waste material into a desired particle size or format for mixing with water. In some embodiments, the treated water obtained during the process of the present disclosure can be recycled for mixing with the waste material.

Some waste materials (such as sewage sludge or waste water sludge) have inherent moisture content therein, so that the waste material itself is liquid or is of a sufficiently liquid form to require little or no added water to form a feedstock of the desired viscosity.

In some embodiments, the process involves drying the waste material to obtain a waste material feedstock of a desired viscosity and/or consistency.

In some embodiments, the process further involves a pre-processing step for removing untreatable items from the waste material, and wherein the untreatable items are selected from the group including sand, metals, rocks, glass, and nontreatable waste.

Depending upon the remainder of the process these or other items may be most desirably removed from the waste material in advance of preparing the feedstock, while in other embodiments of the process it may not be necessary.

In some embodiments, the preprocessing step may also include addition of other ingredients such as reactor catalyst components or the like that will enhance the performance of the hydrothermic liquefaction reaction.

The process can be carried out with the heating step being done in a batch or continuous feeding mode in the processor, with an appropriate equipment design. In some embodiments, the process is continuous flow process.

Different types of processors or reactor units can be used to carry the process of the present disclosure. In some embodiments, the processor is a tube reactor having inner and outer pipe design, such as described in Applicant's CA Patent No. 3011641, the disclosure of which is incorporated herein in its entirety. The distinctive inner configuration of this tube reactor allows for optimization of the heat exchange profile, facilitating efficient transfer of heat from the tube reactor to the feedstock slurry within the processor. Importantly, this design aims to prevent any undesired combustion of the contents within the reactor. As the process of the present disclosure involves exothermic reactions that release substantial amounts of energy, the space between the inner and outer pipes serves as a conduit for the recovery of the released energy. This not only ensures the safety of the contents within the processor by preventing overheating or burning but also allows for the effective utilization of the surplus energy generated during the exothermic reactions. The pipe design of this tube reactor can strategically balance heat exchange to protect the feedstock slurry from undesirable consequences while efficiently recovering excess energy produced during the HTL process.

The invention will now be described with reference to specific examples. It will be understood that the following examples are intended to describe embodiments of the invention and are not intended to limit the invention in any way. It will be understood that certain aspects of the disclosed processes can be arranged and combined in a wide variety of different configurations, all of which are contemplated herein.

EXAMPLES

Three different batches of the sewage sludge as feedstock were processed through a HTL unit. In a typical HTL run, 900 g of the sewage sludge feedstock was weighed and inserted into the 2 L reactor along with 400 g of de-ionized water to mitigate PFAS contamination risks. The contents were mixed using mechanical agitation. The reactor was operated for 1 hour, at the parameters of 350° C. and 3,200 psig. After the HTL run, the reactor was allowed to cool to ambient temperatures prior to venting off the residual gas through an exhaust line into a controlled fume hood unit. Samples of each of the three HTL byproducts (aqueous effluent water, biocrude oil and solid biochar) were collected for lab analysis.

The separated fractions were tested for PFAS and their analytes, utilizing the EPA 537 isotope dilution test method. The results of the analyte testing is shown in Table 1.

| | BIOSOLIDS FEEDSTOCK (1) | | | OIL | | | CHAR | | | WATER (2) | | |
|---|---|---|---|---|---|---|---|---|---|---|---|---|
| | #1 | #2 | #3 | #1 | #2 | #3 | #1 | #2 | #3 | #1 | #2 | #3 |
| TEST NUMBER | 091-1 | 064-1 | 064-2 | 091-2 | 064-5 | 064-6 | 091-3 | 064-7 | 064-8 | 091-4 | 064-3 | 064-4 |
| PERCENT SOLIDS | 22.20% | 22.2% | 22.2% | Sold | 88.90% | 87.40% | 98.90% | 100.00% | 97.90% | 0% | 0% | 0% |
| UNIT | ng/g | ng/g | ng/g | ng/g | ng/g | ng/g | ng/g | ng/g | ng/g | ng/g | ng/g | ng/g |
| ANALYTE | (ppb) | (ppb) | (ppb) | (ppb) | (ppb) | (ppb) | (ppb) | (ppb) | (ppb) | (ppb) | (ppb) | (ppb) |
| Perfluorosulfonic Acid | ND | ND | ND | ND | ND | ND | ND | ND | ND | ND | ND | ND |
| HFPODA | ND | ND | ND | ND | ND | ND | 3.6 | ND | ND | ND | ND | ND |
| PFECA B | ND | ND | ND | ND | ND | ND | ND | ND | ND | ND | ND | ND |
| NEtFOSE | 4.4 | 3.5 | ND | ND | 11 | 28 | ND | ND | 3.6 | ND | ND | ND |
| Perfluorooctanesulfonic Acid (PFOS) | 4.7 | 7.3 | 4.0 | 2.7 | 47 | 15 | 7.6 | 1.1 | 5.5 | ND | ND | ND |
| Perfluoroundecanoic Acid | 0.79 | ND | 1.0 | ND | ND | ND | ND | ND | ND | ND | ND | ND |
| NMeFOSAA | 3 | ND | 2.4 | ND | ND | ND | ND | ND | ND | ND | ND | ND |
| NMeFOSE | 5.4 | 6.6 | 6.8 | ND | 100 | 95 | ND | 0.70 | 7.3 | ND | ND | ND |
| Perfluoropentanoic Acid | ND | ND | ND | ND | 47 | 24 | ND | 1.0 | 2.4 | ND | ND | 3400 |
| Perfluoropentanesulfonic Acid | ND | ND | ND | ND | ND | ND | ND | 0.90 | ND | ND | ND | ND |
| 6:2 Fluorotelomer Sulfonic Acid | ND | ND | ND | 0.94 | 6.7 | ND | 3.9 | 0.65 | 3.6 | ND | ND | ND |
| NEtFOSAA | 2.5 | 2.8 | 2.3 | ND | ND | ND | ND | ND | ND | ND | ND | ND |
| Perfluorohexanoic Acid | 1.9 | 1.6 | 2.3 | ND | ND | ND | 0.87 | ND | ND | ND | ND | 250 |
| Perfluorododecanic Acid | 0.97 | ND | 1.1 | ND | ND | ND | ND | ND | ND | ND | ND | ND |
| NMeFOSA | ND | ND | ND | ND | ND | ND | ND | ND | ND | ND | ND | ND |
| Perfluorooctanoic Acid (PFOA) | 1.5 | 1.8 | 1.7 | ND | ND | ND | 0.82 | 0.73 | ND | ND | ND | ND |
| Perfluorodecanoic Acid | 1.1 | 1.4 | 1.2 | 0.24 | ND | ND | ND | ND | ND | ND | ND | ND |
| Perfluorodecanesulfonic Acid | ND | 1.5 | ND | ND | ND | 2.6 | ND | ND | 0.72 | ND | ND | ND |
| Perfluorohexanesulfonic Acid | ND | 0.92 | ND | ND | ND | ND | 0.57 | ND | 2.2 | ND | ND | ND |
| 3:3 FTCA | 1.8 | 1.6 | ND | ND | ND | ND | ND | ND | 17 | ND | ND | ND |
| Perfluorobutanesulfonic Ack | ND | ND | ND | 2.8 | 10 | ND | 10 | ND | 6.4 | 410 | 300 | ND |
| Perfluoroheptanoic Acid | ND | ND | ND | ND | ND | ND | ND | ND | ND | ND | ND | ND |
| Perfluoroheptanesulfonic Acid | ND | ND | ND | ND | ND | ND | ND | ND | ND | ND | ND | ND |
| Perfluorononaoic Acid | ND | ND | ND | ND | ND | ND | ND | ND | ND | ND | ND | ND |
| Perfluorotetradecanoic Acid | ND | ND | ND | ND | ND | ND | ND | ND | ND | ND | ND | ND |
| PFECA F | ND | ND | ND | ND | 0.23 | ND | ND | ND | ND | ND | 110 | 140 |
| 8:2 Dluorotelomer Sulfonuc Acid | ND | ND | ND | ND | ND | ND | 2.1 | ND | 1.4 | ND | ND | ND |
| NEtFOSA | ND | ND | ND | ND | ND | ND | ND | ND | ND | ND | ND | ND |
| Perfluorononanesulfonic Acid | ND | ND | ND | ND | ND | ND | ND | ND | ND | ND | ND | ND |
| Perfluorotridecanoic Acid | ND | ND | ND | ND | ND | ND | ND | ND | ND | ND | ND | ND |
| Perfluorooctanesulfonamide | 0.51 | ND | ND | ND | 0.91 | ND | ND | ND | ND | ND | ND | ND |
| 9O-PF3ONS | ND | ND | ND | ND | ND | ND | ND | ND | ND | ND | ND | ND |
| 4:2 Fluorotelomer Sulfonic Acid | ND | ND | ND | ND | ND | ND | ND | ND | ND | ND | ND | ND |
| 11Cl-PF3OUdS | ND | ND | ND | ND | ND | ND | ND | ND | ND | ND | ND | ND |
| Perfluorododecanesulfonic Acid | 3.2 | ND | 2.8 | ND | ND | 4.1 | ND | 0.47 | 0.39 | ND | ND | ND |
| 7:3 FTCA | 4.3 | 3.5 | 3.3 | 2.3 | 25 | 13 | 2.3 | 0.36 | 2.9 | ND | ND | ND |
| PFECA A | ND | ND | ND | ND | ND | ND | ND | ND | ND | ND | ND | ND |
| 5:3 FTCA | 38 | ND | 35 | 23 | ND | 140 | 6.1 | 2.7 | 19 | 300 | 450 | 680 |
| DONA | ND | ND | ND | ND | ND | ND | ND | ND | ND | ND | ND | ND |
| Perfluorobutanoic Acid | ND | ND | ND | ND | 6.6 | 21 | ND | 14 | 3 | 2300 | 6700 | 2800 |

-continued

| | BIOSOLIDS FEEDSTOCK (1) | | | OIL | | | CHAR | | | WATER (2) | | |
|---|---|---|---|---|---|---|---|---|---|---|---|---|
| | #1 | #2 | #3 | #1 | #2 | #3 | #1 | #2 | #3 | #1 | #2 | #3 |
| Compounds Detected | 15 | 11 | 12 | 6 | 11 | 9 | | 10 | 4 | 3 | 3 | 5 |
| Compounds Not Detected | | | | | | | | | | | | |
| Compounds Created/Liberated | n.a. | n.a | n.a | | | | | | | | | |
| Compounds Tested For | 40 | 40 | 40 | 40 | 40 | 40 | 40 | 40 | 40 | 40 | 40 | 40 |
| Total Detected | | 17 | | | 15 | | | 18 | | | 6 | |

The results are summarized below:

Although it varied from 11 to 15 PFAS compounds per individual batch, a total of 17 different PFAS compounds were detected in the three feedstock batches. PFOA and PFOS were detected in all three.

Except for one, all of the compounds detected in the sewage sludge feedstock batches (including the PFOA and PFOS) were in the single-digits, parts per billion concentrations.

Due to processing at high temperature and pressure, some of the long-chain PFAS compounds were converted to less-harmful, short-chain compounds in the by-products that were not detected in the original biosolids.

While there were six PFAS compounds detected in the water by-product that would be returned to the waste water treatment plant, no PFOS and PFOA were detected in the water by-product in any of the three trials.

These tests results indicated that the process of the present invention can achieve 95% PFAS removal, with no detectable PFOS and PFOA in the output water.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A process for treating a waste material contaminated with per- and polyfluoroalkyl substances (PFAS), the process comprising:

providing a feedstock comprising the waste material, the feedstock having a moisture content;

processing the waste material under hydrothermal liquefaction (HTL) reaction conditions comprising a temperature in the range of about 300-450° C., and a pressure in the range of about 3000 psi to about 3750 psi (about 20 MPa to about 26 MPa), for a reaction time up to 15 minutes, to obtain a processed mixture comprising biocrude oil, biochar, water and PFAS components, wherein the waste material is processed in the absence of additional solvent and a catalyst; and separating the processed mixture into a liquid fraction comprising the biocrude oil and a portion of the PFAS components, a solid fraction comprising the biochar and a portion of the PFAS components, and an aqueous fraction substantially devoid of PFAS components.

2. The process of claim 1, wherein the process further comprises heating the waste material at a rate from 15° C./min to 60° C./min to achieve the HTL temperature about 300-400° C.

3. The process of claim 1, wherein the process further comprises quenching the processed mixture at a rate from 30° C./min to 50° C./min.

4. The process of claim 1, further comprising treating the aqueous fraction to obtain treated water suitable for recycling into environment, and/or suitable for use as drinking water.

5. The process of claim 1, further comprising storing or sequestering the liquid fraction and/or the solid fraction.

6. The process of claim 1, further comprising upgrading/reforming the liquid fraction to obtain fuel and to separate the PFAS components.

7. The process of claim 1, further comprising upgrading/reforming the solid fraction to separate the PFAS components.

8. The process of claim 1, wherein the feedstock is waste water sludge or sewage sludge having the moisture content.

9. The process of claim 8, wherein the feedstock is provided as a slurry.

10. The process of claim 1, wherein the waste material is a solid material and the process further comprises mixing water with the waste material to obtain the feedstock with the moisture content.

11. The process of claim 10, wherein the feedstock is provided as a slurry.

12. The process of claim 1, wherein the pressure is in the range of about 3100 psi to about 3300 psi.

13. The process of claim 1, wherein the reaction time is up to 10 minutes.

14. The process of claim 1, further comprising a pre-processing step for removing untreatable items from the feedstock.

15. The process of claim 1, wherein the process is a continuous flow process.

* * * * *